United States Patent Office 2,833,707
Patented May 6, 1958

2,833,707

ELECTROLYTIC PRODUCTION OF ALUMINA

Pietro Guareschi, Genoa, Italy

No Drawing. Application May 21, 1951
Serial No. 227,513

Claims priority, application Italy January 29, 1951

1 Claim. (Cl. 204—96)

This invention relates to the production of alumina from silico-aluminous materials like clay, kaolins, leucites, alumstones, feldspars, etc.

It is known that the processes now in use for obtaining metallic aluminum consist in treating silicious bauxites (hydrated aluminum oxyde) by means of alkaline solutions (Bayer process) and, once alumina is obtained, in converting this alumina into artificial cryolite for obtaining metallic aluminum through the electrolysis of molten alumina in a bath of molten chlorides and fluorides.

This invention provides a process by which a great yield can be attained in the extraction of alumina from silico-aluminous ores and most of the inconveniences affecting the known processes are avoided.

It moreover makes it possible to exploit ores even of low aluminum content which cannot be utilized by the processes heretofore used.

According to the process of the invention alumina is produced by electrolysis of aluminum salts, such as aluminum sulphate, in the presence of corresponding ammonium sulphate, thereby obtaining hydrated alumina on the cathode and acid solution on the anode.

The addition of ammonium sulphate promotes the precipitation of hydrated alumina and prevents the formation of an insulating deposit on the cathode, thus maintaining the conductivity of the electrolytic bath constant.

The aluminum salt to be subjected to electrolysis, e. g. sulphate, is preferably obtained by acid attack of the aluminum ores (oxides or silicates) with subsequent filtration and purification in order to remove the salts of metals other than aluminum, especially iron salts.

An embodiment of the invention for obtaining alumina from silico-aluminous ores will now be described by way of example.

The starting material, which may consist of kaolins, clays, etc., is attacked by diluted sulphuric acid in suitable containers after a preliminary roasting of the material at a low temperature. This roasting phase may also be carried out in a furnace at 300–400° C. with the bisulphate of an alkali metal.

The resulting solution is decanted and must thereafter be purified from other metals, particularly from iron, this being the most undesirable impurity.

To this end the iron is precipitated in acid solution with the ferrocyanide of an alkali metal (sodium or potassium), thereby causing the formation of ferric ferrocyanide (Prussian blue) which is removed by filtration and, if desired, regenerated with soda.

The ferrocyanide of an alkali metal should always be present in excess in order to obtain a mass effect in the precipitation, and this excess of ferrocyanide will have to be eliminated afterwards. For this purpose a metal salt will be introduced which is able to form with the ferrocyanide a solid compound precipitating with the ferric ferrocyanide and the presence of which does not interfere with electrolysis. This condition is satisfied by copper sulphate, which forms copper ferrocyanide that precipitates and is collected on the filter.

By using a copper salt there is the advantage that copper ferrocyanide forms with ferric ferrocyanide a double salt which flocculates and promotes the precipitation of ferric ferrocyanide. The copper sulphate that might remain in the solution can be precipitated by means of metal aluminum in plate or powder form.

After this purification, the solution is treated by electrolysis.

According to the invention, to the solution of aluminum sulphate is added ammonium sulphate whereby double salts are formed.

The ammonium salts may be added in high ratios, e. g. from 4 to 10 times the amount of aluminum sulphate present.

The electrolysis of the acid solution of aluminum salts is carried out in electrolytic cells containing a cathode of stainless steel, and an anode of lead.

The current density should be high, in the order of over 1000 amperes per square meter. The voltage should only be a little over theoretical. The electrolysis should be effected with a porous diaphragm interposed between the cathodic and the anodic compartment.

The remaining anolyte is recycled for the attack of the ores roasted in the furnace.

I claim:

A process for electrolytic production of alumina, comprising the steps of roasting a starting silico-aluminous material, attacking said roasted material with sulphuric acid, decanting the resulting solution, purifying said solution from iron salts, adding ammonium sulphate in a ratio of 4–10 times the quantity of aluminum sulphate present, and electrolyzing said final solution to precipitate aluminum hydroxide.

References Cited in the file of this patent

UNITED STATES PATENTS

| | | |
|---|---|---|
| 1,382,808 | Sem | June 28, 1921 |
| 1,556,543 | Pomilio et al. | Oct. 6, 1925 |
| 1,559,179 | Pomilio et al. | Oct. 27, 1925 |
| 1,953,144 | Wilson | Apr. 3, 1934 |
| 2,447,386 | Antonoff | Aug. 17, 1948 |

FOREIGN PATENTS

| | | |
|---|---|---|
| 30,846 | Norway | June 28, 1920 |

OTHER REFERENCES

Report of Investigations (R. I. 3438), March 1939, of U. S. Dept. of Interior, Bureau of Mines. By J. Koster et al., pages 1, 13, 14 and Fig. 3.